United States Patent [19]

Vidwans et al.

[11] Patent Number: 4,861,107
[45] Date of Patent: Aug. 29, 1989

[54] HEAD REST WITH FORWARDLY PIVOTABLE PAD MOUNTED ON FRICTION HINGE

[75] Inventors: Mohan P. Vidwans, Saline; Duane Potes, Adrian; John P. Opalia, Ypsilanti, all of Mich.

[73] Assignee: Hoover Universal, Inc., Ann Arbor, Mich.

[21] Appl. No.: 208,032

[22] Filed: Jun. 13, 1988

[51] Int. Cl.[4] .............................................. A47C 1/10
[52] U.S. Cl. ....................................... 297/408; 297/391
[58] Field of Search ............... 297/391, 399, 403, 408; 403/91, 98, 113, 145; 74/526, 531

[56] References Cited
U.S. PATENT DOCUMENTS

| 3,948,562 | 4/1976 | Grabner et al. | 297/408 |
| 4,190,290 | 2/1980 | Strien | 297/408 |
| 4,190,291 | 2/1980 | Korger | 297/408 |
| 4,191,422 | 3/1980 | Inasawa et al. | 297/391 |
| 4,191,423 | 3/1980 | Goldner | 297/408 |
| 4,600,240 | 7/1986 | Suman et al. | 297/408 |
| 4,640,549 | 2/1987 | Yokota | 297/408 |

Primary Examiner—Kenneth J. Dorner
Assistant Examiner—Brian K. Green
Attorney, Agent, or Firm—Harness, Dickey & Pierce

[57] ABSTRACT

A head rest for mounting on an automotive seat back comprises a rod fixed to the back, the rod having a generally horizontal mounting portion, a frame having a pad thereon, a mounting bracket secured to the frame, the bracket attaching the frame to the rod for pivotal movement of the frame forward and backward, and a frictional bushing sandwiched between the bracket and the frame. The bushing has a curved portion cupped over the mounting portion of the rod and fastening means clamping the frame and bracket together and biasing the friction bushing against the rod to resist pivoting of the frame about the rod. The rod further includes stop pins to limit the pivoting of the frame about the rod.

7 Claims, 4 Drawing Sheets

HEAD REST WITH FORWARDLY PIVOTABLE PAD MOUNTED ON FRICTION HINGE

BACKGROUND AND SUMMARY OF THE INVENTION

This invention relates generally to head rests and more particularly to head rests for mounting on a motor vehicle seat back and being frictionally adjustable about a horizontal axis.

Vehicle head rests which are adjustable have been provided with somewhat complex mechanisms to prevent rotation of the head rest about its support. Some examples are disclosed in U.S. Pat. Nos. 4,193,631, 4,600,240 and 4,191,423.

An object of this invention is to provide a head rest for a motor vehicle seat back having an improved simplified mounting assembly for frictional pivoting of the head rest through a limited arc of rotation about a horizontal axis.

It is another object of the present invention to provide a head rest wherein the frictional resistance to pivotal motion is variable.

A preferred embodiment of the head rest for use on a back rest of a vehicle seat according to the present invention comprises an inverted U-shaped rod having its downwardly extending legs fixed to the back rest. The transverse portion between the legs is generally horizontal and above the top of the back rest.

Wrapped over the transverse portion of the rod is an elongated friction bushing having a major and a minor axis. The bushing is elongated along the major axis and has a curved portion and a straight portion forming a J-shaped cross section along the minor axis. Alternatively, the bushing may have only a curved portion forming a C-shaped cross section along the minor axis. The curved portion of the bushing is wrapped around the transverse portion of the rod thus cupping the rod.

On the top of the rod is positioned a head rest frame which has a foam head rest pad preferably foamed in place thereon. The frame has an upright portion and a flange portion. The flange portion is attached to the rod.

A clamping bracket having a mounting flange portion and a curved, U-shaped channel clamping portion is positioned with the clamping portion over and around the curved portion of the bushing and around the rod. Along the outer edge of the mounting flange portion is a curved lip. The mounting flange portion of the bracket and the flange portion of the frame are fastened together by a bolt and nut assembly, the bolt passing through aligned holes in the flanges of the frame, the bushing, and the clamping bracket. The curved lip rests against the flange portion of the frame so that the clamping bracket is hinged against the frame along the edge of the curved lip. When tightened, the bolt and nut assembly biases the curved portion of the bracket against the bushing and in turn the bushing against the rod and the frame thus applying a frictional force to the rod resisting rotation of the frame about the rod.

The transverse portion of the rod has a pair of holes spaced apart and bored therethrough. A pair of stop pins are pressed into and through so as to project from the holes. In one preferred embodiment, the bushing and bracket each have aligned slots therethrough through which the stop pins project. When the head rest is pivoted, the pins engage against the frame to limit rotation of the head rest in one direction. The bracket engages the pins at the other end of the slots to limit rotation of the rest in the other direction. In another embodiment, the pair of pins are spaced further apart then the length of the bracket and bushing thus eliminating need for aligned slots. In this case the pins engage the frame to limit rotation of the head rest in both directions.

The degree of frictional clamping applied between the head rest and the transverse portion of the rod is variable according to the amount of torque applied to the bolt and nut assembly and according to the material chosen for the frictional bushing.

The result is a head rest which can be pivoted frictionally between a limited forward position and a backward pivoted position for the comfort and safety of the seat occupant.

Further objects, features and advantages of the invention will become apparent from a consideration of the following description and the appended claims when in connection with the accompanying drawing.

DETAILED DESCRIPTION OF THE INVENTION

Figure 1:
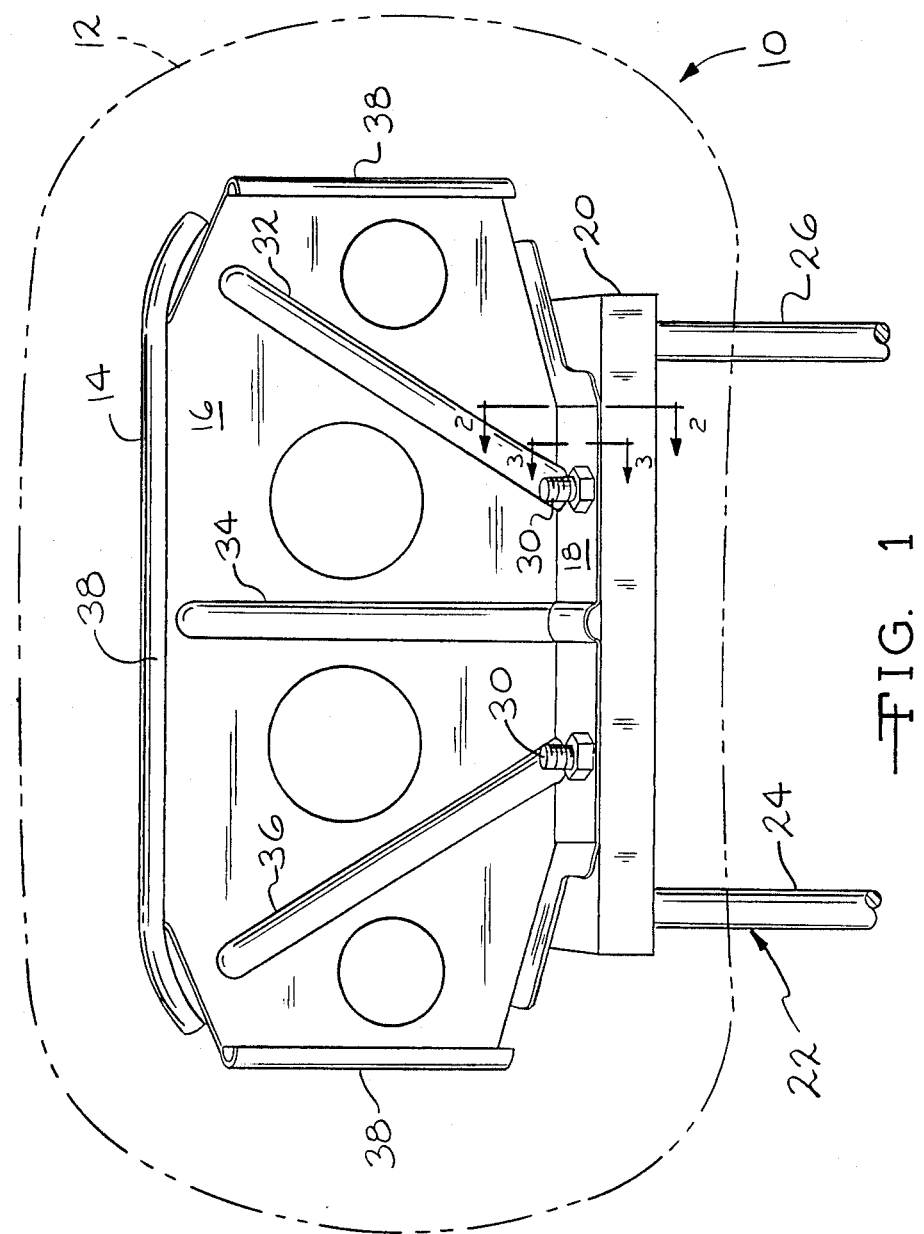
FIG. 1 is a front view of the head rest according to the present invention showing the head rest pad in phantom lines.

Turning now to the drawing, a head rest 10 according to a preferred embodiment of the present invention is shown in FIG. 1. A foam pad 12 is shown in phantom lines for clarity of the mounting structure. The head rest 10 includes the frame 14 having an upright portion 16, a flange portion 18 bent at an approximate right angle from the upright portion 16, a bracket housing 20 and a mounting rod 22. Frame 14 is formed from sheet metal, plastic or any other suitable material. Rod 22 is an inverted, generally U-shaped hollow tube or solid rod having at least one and preferably two vertical legs 24 and 26 and a horizontal transverse portion 28 to which the frame 14 and the housing 20 are bolted via bolt and nut assemblies 30.

The upright portion 16 of the frame 14 includes reinforcing ribs 32, 34 and 36 which rigidify the frame structure and maintain rigid the angle between the upright portion 16 and the flange portion 18. The side and upper edges of frame 14 are curved so as to present blunt edges 38 for any impact which might occur between the head rest and an occupant of a vehicle during an accident.

Figure 2:
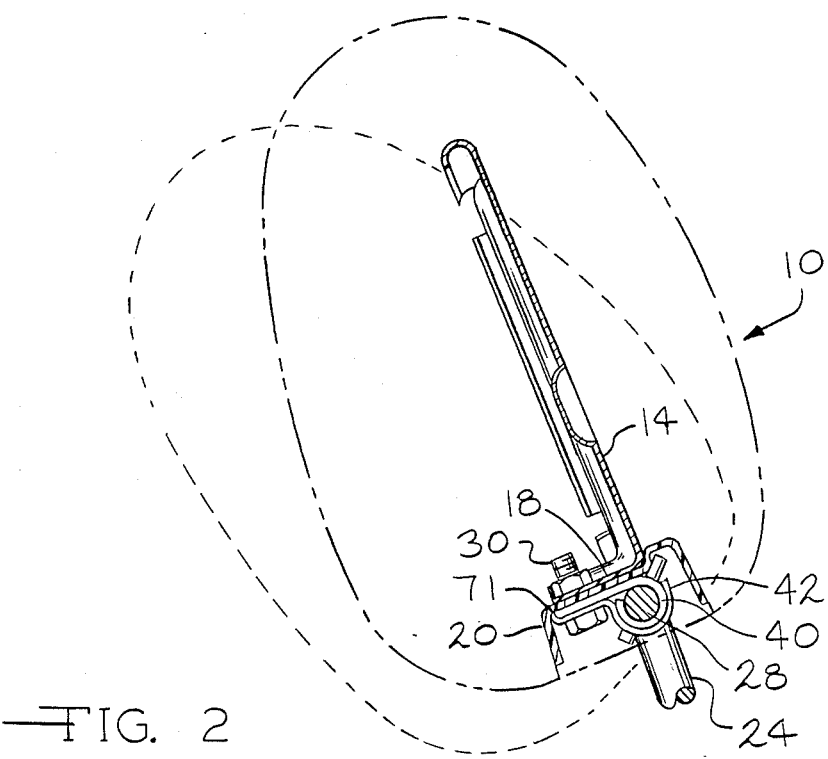
FIG. 2 is a sectional view of the head rest shown in FIG. 1 taken on the line 2—2.
Figure 3:
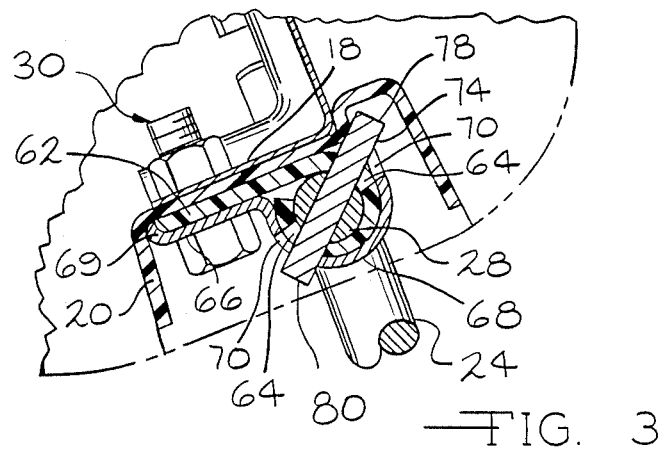
FIG. 3 is an enlarged partial sectional view taken along the lines 3—3 in FIG. 1.
Figure 4:
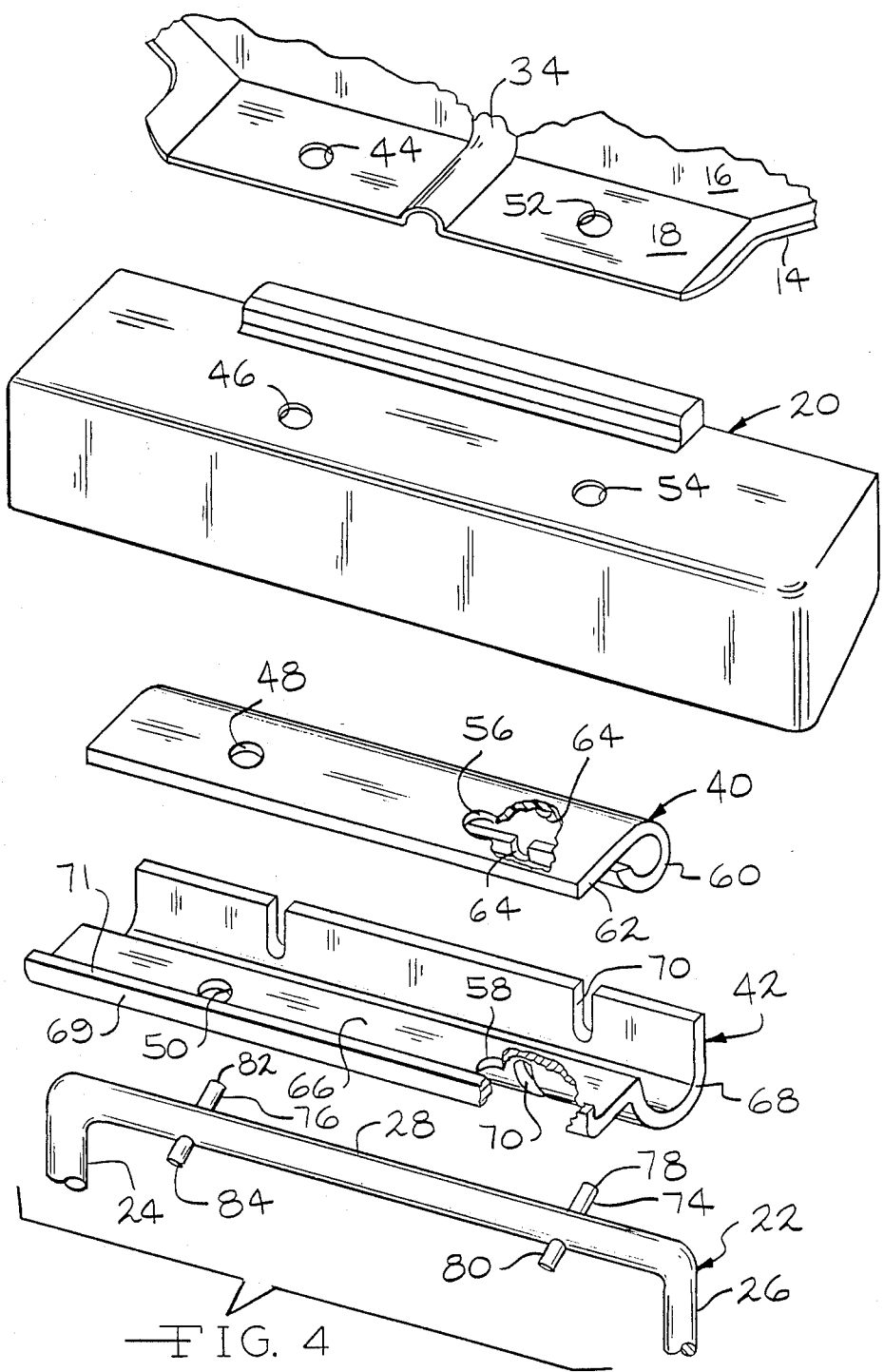
FIG. 4 is an exploded view of the head rest assembly parts shown in FIGS. 1 through 3.

The actual mounting configuration of the head rest 10 is clearly shown in the sectional views of FIGS. 2 and 3. In addition, FIG. 4 illustrates separately the individual parts comprising the assembly shown in FIGS. 1 through 3. The bracket housing 20 is bolted to the underside of the flange portion 18 of the frame 14 along with a friction bushing 40, and a mounting bracket 42. The flange 18, bracket housing 20, friction bushing 40 and the bracket 42 are bolted together through aligned holes 44 through 50 and 52 through 58 in each of these members via the bolt and nut assemblies 30.

As shown in FIG. 2 through 4, the friction bushing 40 is an elongated plastic member elongated along its major axis. The friction bushing 40 has a J-shaped cross section along its minor axis thus the friction bushing 40 has a curved portion 60 and a flat flange portion 62. Two pairs of radially opposing slots 64 are positioned axially along the major axis of the friction bushing 40 through the curved portion 60.

The mounting bracket 42 comprises a flange portion 66 joining a curved clamping portion 68. Opposite clamping portion 68, flange portion 66 has an upwardly curved lip 69. Lip 69 is bent normal to the surface of mounting flange portion 66 so as to form an upwardly projecting edge 71. Edge 71 bears against housing 20 as shown in FIGS. 2, 3, and 6, or, in the alternative embodiment shown in FIG. 5, against flange 18 of frame 14.

Passing through the transverse bores through the transverse portion 28 of rod 22 are a pair of stop pins 74 and 76 best shown in FIG. 4. Pairs of opposing slots 70 are spaced along the clamping portion 68 of bracket 42 in spaced alignment with slots 64 in friction bushing 40. Ends 78 and 80 of the stop pins 74 and ends 82 and 84 of the stop pins 76 protrude through the slots 64 and the slots 70 in the friction bushing 40 and the mounting bracket 42 respectively as shown in FIGS. 2 and 3 when the components shown in FIG. 4 are assembled to frame 14. The ends 78 and 82 of the stop pins 74 and 76 limit rotational pivoting of the frame 14 about the rod 22 in the clockwise direction as shown in FIG. 3. The ends 78 and 92 of the stop pins 74 and 76 engage the bracket housing 20 in the back position of the head rest 10. Forward rotation or pivoting about the transverse portion 28 of the rod 22 is limited by contact between the ends 80 and 84 of the pins 74 and 76 against the end of the slot 70 in the mounting bracket 42. Thus the length of the slot in the mounting bracket 42 dictates to some degree the range of travel between forward and back positions of the head rest 10.

As can be seen in FIG. 3, a tightening torque applied to each bolt and nut assembly 30 compresses the mounting bracket 42 against the flange portions 62 and 18 as well as the bracket housing 20. This torque applies a cantilevered bias to the curved portion 68 of the mounting bracket 42 which compresses the curved portion 60 of the friction bushing 40 against the transverse portion 28 of rod 22. An increase of the torque applied via each bolt and nut assembly 30 increases the frictional force applied to the transverse portion 28 of rod 22. Correspondingly, a decrease in the torque applied to each bolt and nut assembly 30 transmits less force against the transverse portion 28 of rod 22.

In addition, a different choice of plastic materials for the frictional bushing 40 changes the frictional force that can be applied by a given amount of torque on each bolt and nut assembly 30. Thus the amount of manual force required to move the head rest from the forward to the backward position may be varied both by choice of the bushing material and by the torque applied to the bolts. This adjustment feature accommodates the manual manipulation preferences of different vehicle occupants.

Figure 5:
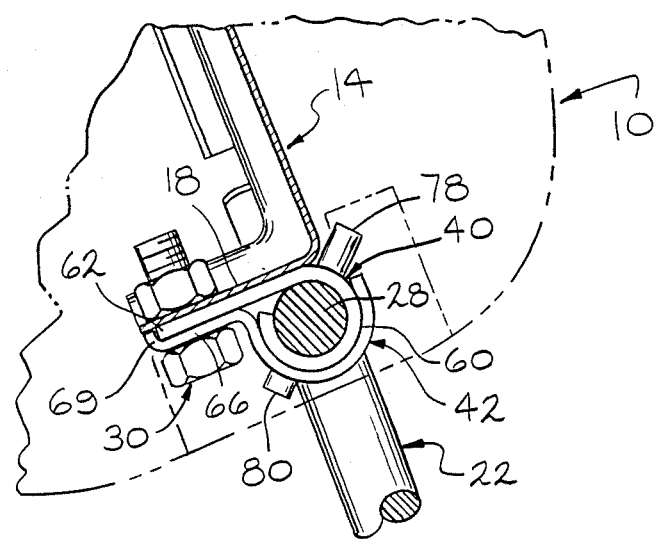
FIG. 5 is a partial sectional view of an alternative embodiment of the present invention.
Figure 6:
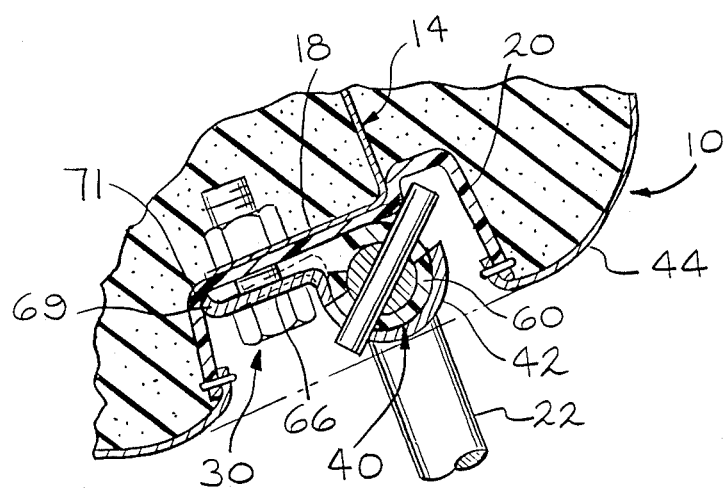
FIG. 6 is a partial sectional view of the head rest shown in FIG. 1 illustrating another alternative embodiment of the present invention.

An alternative preferred embodiment of the present invention without bracket housing 20 is shown in FIG. 5. Bracket housing 20 is only necessary where a cover for the head rest pad must be sewn on or the pad 12 is foamed in place.

In operation, the head rest 10 is again limited in backward movement by ends 78 and 82 of stop pins 74 and 76, but by directly contacting frame 14. Correspondingly, ends 80 and 84 of stop pins 74 and 76 limit forward pivoting of head rest 10 about transverse portion 28 of rod 22 by contacting the ends of slots 70.

Another alternative preferred embodiment is shown in FIG. 6. This embodiment is identical to those above described except that friction bushing 40 is formed entirely of curved portion 60 thus having a C-shape cross section. Bolt and nut assembly 30, when tightened, can cause bracket 42 to exert more force in this embodiment against bushing 40 because of the greater clearance between housing 20 and flange 66 than in the other illustrated embodiments. Flange 66 of bracket 42 can yieldably deflect about the edge 71 of flange 66 to the position shown in dotted lines in FIG. 6 as bolt and nut assembly 30 is tightened. This deflection results in a continuous spring force through curved portion 68 against friction bushing 40. The elimination of flange portion 62 of bushing 40 thus permits a wide range of frictional adjustment in this embodiment.

The head rest 10 of the present invention provides a simple pivotal rest structure having variable frictional resistance to forward and backward movement of the head rest. The resistance to pivotal movement may be varied by the choice of particular bushing material and by the torque applied to bolt and nut assembly 30.

The invention has been described above in an illustrative manner. It is to be understood that the terminology that has been used is intended to be in the nature of words of description rather than of limitation. Obviously many modifications and variations of the present invention are possible in light of the above teachings. It is therefore to be understood that within the scope of the appended claims the head rest according to the present invention may be practiced otherwise as specifically described.

What is claimed is:

1. A head rest for mounting on an automotive vehicle seat back comprising:

a rod affixed to said back, said rod having a generally horizontal mounting portion;

a frame having a pad thereon;

a friction bushing substantially surrounding said horizontal mounting portion of said rod and in frictional engagement with said rod;

a mounting bracket secured to said frame, said bracket attaching said frame to said rod by sandwiching said rod and said friction bushing between said frame and said bracket for pivotal movement of said frame forward and backward about said horizontal mounting portion;

fastening means for clamping said frame and bracket together and biasing said friction bushing against said rod to apply a frictional force against said rod resisting pivoting of said frame about said rod; and stop means fixed to said rod for limiting the movement of said frame relative to said rod to rotation through a limited arc, said frame being freely rotatable through said arc except for the resistance of said frictional force of said bushing on said rod.

2. The head rest according to claim 1 wherein said rod has two downwardly extending ends with said horizontal mounting portion therebetween.

3. The head rest according to claim 1 wherein said stop means comprises a pin passing through and projecting from a bore transversely through said rod, said bushing and said bracket having aligned slots therethrough through which said pin projects, said pin engaging the frame to limit rotation of the head rest in one direction and engaging said bracket at the other end of said pin to limit rotation of the head rest in the other direction.

4. The head rest according to claim 1 or 3 wherein the frame, the bracket, and the friction bushing each has a flange portion having at least one aligned hole therethrough spaced from said curved portion for passage of a bolt therethrough, said fastening means comprising a bolt and nut, said bolt passing through said aligned holes, said bolt and nut threadably engaged together to draw said flange portions together biasing said bushing against said rod.

5. The assembly according to claim 4 wherein said friction bushing is an elongated strip of plate plastic material having a J-shaped cross section with the curved portion wrapped around the mounting portion of said rod.

6. A head rest for use on an automotive vehicle seat back, said head rest comprising:
   an inverted U-shaped rod affixed to said back, said rod having downwardly extending legs and a transverse portion between said legs;
   an elongated friction bushing having a curved portion wrapped around and in frictional engagement with said transverse portion of said rod;
   a head rest frame having a padded upright portion and a flange portion for attachment of said frame to said rod;
   a bracket for securing said flange portion of said frame to said rod, said bracket having a mounting portion and a curved clamping portion, said clamping portion being positioned over and around said curved portion of said bushing on said rod, said mounting portion of said bracket being positioned adjacent said flange portion of said frame;
   fastening means clamping said flange portion of said frame to said mounting portion of said bracket thereby mounting said frame to said rod and biasing said clamping portion of said bracket against said bushing and causing said bushing to apply a frictional force to said rod to resist rotation of said frame about said rod; and
   stop means fixed to said rod for limiting the rotation of said frame about said rod.

7. The head rest according to claim 6 wherein said stop means comprises a pin passing through and projecting from a bore transversely through said rod, said bushing and said bracket having aligned slots therethrough through which said pin projects, said pin engaging the frame to limit rotation of the head rest in one direction and engaging said bracket at the other end of said pin to limit rotation of the rest in the other direction.

* * * * *